(12) United States Patent
Matsuoka et al.

(10) Patent No.: US 9,166,286 B2
(45) Date of Patent: Oct. 20, 2015

(54) COMMUNICATION DEVICE

(71) Applicant: PANASONIC INTELLECTUAL PROPERTY MANAGEMENT CO., LTD., Osaka (JP)

(72) Inventors: Satori Matsuoka, Fukuoka (JP); Shouji Yamagishi, Kanagawa (JP); Kenichi Nakagawa, Fukuoka (JP); Katsuhiro Sasaki, Fukuoka (JP); Koichi Shibata, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/347,056

(22) PCT Filed: Mar. 29, 2013

(86) PCT No.: PCT/JP2013/002191
§ 371 (c)(1),
(2) Date: Mar. 25, 2014

(87) PCT Pub. No.: WO2014/155424
PCT Pub. Date: Oct. 2, 2014

(65) Prior Publication Data
US 2014/0291404 A1    Oct. 2, 2014

(51) Int. Cl.
*G06K 7/10* (2006.01)
*H01Q 1/52* (2006.01)
*H01Q 1/22* (2006.01)
(Continued)

(52) U.S. Cl.
CPC ............ *H01Q 1/521* (2013.01); *G06K 7/10336* (2013.01); *G06K 7/10386* (2013.01); *G06K 7/10881* (2013.01); *H01Q 1/2216* (2013.01); *H01Q 1/243* (2013.01); *H01Q 7/00* (2013.01); *H02J 7/025* (2013.01)

(58) Field of Classification Search
CPC .......... G06K 7/10881; G06K 7/10693; G06K 7/10891; G06K 7/10851; G06K 17/0022; G06K 7/10772
USPC ............. 235/462.43, 462.44, 462.45, 462.46, 235/472.01, 472.02, 472.03
IPC .................... G06K 7/10881, 7/10693, 7/10891, G06K 7/10851, 17/0022, 7/10772
See application file for complete search history.

(56) References Cited

U.S. PATENT DOCUMENTS

| 7,211,986 B1 * | 5/2007 | Flowerdew et al. .......... 320/108 |
| 7,259,690 B1 * | 8/2007 | Furmidge et al. ........ 340/870.03 |
| 2014/0217816 A1 | 8/2014 | Okada |

FOREIGN PATENT DOCUMENTS

| JP | 09-190938 | 7/1997 |
| JP | 09-283950 | 10/1997 |

(Continued)

OTHER PUBLICATIONS

International Search Report and Written Opinion in PCT/JP2013/002191, mail date is Apr. 23, 2013.

*Primary Examiner* — Karl D Frech
(74) *Attorney, Agent, or Firm* — Greenblum & Bernstein, P.L.C.

(57) ABSTRACT

A communication device includes a housing, an opening, an NFC antenna and a contactless charging coil. The NFC antenna is arranged to surround the opening. The communication device further includes a first magnetic sheet which is arranged between the NFC antenna and a main board and between the opening and the main board, and a second magnetic sheet which is arranged between the contactless charging coil and the main board.

17 Claims, 10 Drawing Sheets

(51) Int. Cl.
*H01Q 1/24* (2006.01)
*H02J 7/02* (2006.01)
*H01Q 7/00* (2006.01)

(56) References Cited

FOREIGN PATENT DOCUMENTS

| | | |
|---|---|---|
| JP | 11-122146 | 4/1999 |
| JP | 2003-264934 | 9/2003 |
| JP | 2005-260765 | 9/2005 |
| JP | 2006-042519 | 2/2006 |
| JP | 2010-085109 | 4/2010 |
| JP | 2010-252517 | 11/2010 |
| JP | 2011-123708 | 6/2011 |
| JP | 2012-253398 | 12/2012 |
| JP | 2013-021902 | 1/2013 |
| JP | 2013-048517 | 3/2013 |
| WO | 2012/029347 | 3/2012 |

* cited by examiner

COMMUNICATION DEVICE

TECHNICAL FIELD

The present invention relates to a communication device which has a contactless communication IC module and a contactless charging module.

BACKGROUND ART

Traditionally, a communication device is known in which a contactless charging module is incorporated in a portable communication terminal in which personal information or electronic money of a user are memorized in an IC chip, and which includes a contactless communication IC module that communicates with the outside wirelessly (for example, refer to Patent Literature 1).

As shown in FIG. 10, a communication device (portable communication terminal) 100 described in Patent Literature 1 has a main body lower part 101 and a main body upper part 102 which is rotatably connected to the main body lower part 101.

The main body upper part 102 has a display part 103, a contactless communication IC module 104 and a contactless charging module 105. The display part 103 is provided at the surface of the main body upper part 102. The contactless communication IC module 104 has a contactless communication antenna coil 107. The contactless communication antenna coil 107 is provided at the surface of the main body upper part 102, and it is an antenna to perform wireless communication with a reader/writer. The contactless charging module 105 has a receiving coil 108 to receive power supply from a wireless power supply unit. An electromagnetic shield 109 is arranged between the contactless communication IC module 104 including the contactless communication antenna coil 107 and the display part 103, and the contactless charging module 105 including the receiving coil 108. The electromagnetic shield 109 prevents electromagnetic interference that may occur at the time of contactless charging, and is formed of, for example, material such as copper or aluminum.

The main body lower part 101 has a communication part 106. The communication part 106 includes a mobile communication antenna, communication interfaces and the like.

CITATION LIST

Patent Literature

Patent Literature 1: JP 2011-123708 A (see FIG. 3)

SUMMARY OF INVENTION

Technical Problem

However, in the electromagnetic shield 109 of the previously described traditional communication device 100, Eddy currents occur respectively due to the magnetic fields that the contactless communication antenna coil 107 and the receiving coil 108 on the two sides of the main body upper part 102 generate. The Eddy currents produce demagnetizing fields which demagnetize the magnetic fields generated by the coils.

Therefore, there are problems such as drops of communication efficiency, communications distance, and charging efficiency, due to the demagnetizing fields produced by the Eddy currents. Particularly, when the communication device 100 is used for delivery business or inventory control business, contactless communication may be carried out while contactless charging to the communication device 100 is being performed. For example, a manager holds up an employee ID card which is a contactless ID card over the communication device 100 when the manager performs authentication for the purpose of changing various setting of the communication device 100, and as a result, contactless communication is carried out.

The communication device 100 includes a display part having a large screen and an input part formed of big input keys to make it easy to accomplish business. Furthermore, the battery of the communication device 100 is adapted to be able to be changed by a user to enable long-time business in an outdoor place or a visit destination. Therefore, the contactless communication antenna coil 107 and the receiving coil 108 must be so arranged that the display with a large screen, the information input with big input keys, battery exchange and the like, which are necessary in a terminal for business, will not be hindered.

Besides, in the communication device 100 used for business, waterproof property, dust resistance and drop impact resistance are also required. Contactless communication and contactless charging of the communication device 100 must be implemented without spoiling these waterproof property, dust resistance and drop impact resistance.

The present invention is made to solve the problems, and an object of the present invention is to provide a communication device so that, particularly when contactless communication and contactless charging are carried out at the same time, without spoiling the visibility of the display part or the operation efficiency of information input, battery exchange or the like, electromagnetic interference that may occur at the time of contactless charging is reduced, and communication efficiency and communication distance in the contactless communication, and charging efficiency in the contactless charging can be secured at the same time. Furthermore, the present invention is intended to secure waterproof property, dust resistance and drop impact resistance.

Solution to Problem

A communication device according to an aspect of the present invention includes: a housing which accommodates a display part and a conductor; a display opening which the housing is provided with so that the display part is visible from outside; a magnetic induction antenna which is arranged to face one surface of the conductor; and a contactless charging coil which is accommodated in the housing and is arranged opposite to the magnetic induction antenna while providing the conductor between the contactless charging coil and the magnetic induction antenna, wherein the magnetic induction antenna is arranged to surround the display opening, and the communication device further includes: a first magnetic body which is arranged between the magnetic induction antenna and the conductor and between the display opening and the conductor; and a second magnetic body which is arranged between the contactless charging coil and the conductor.

With the above configuration, particularly when contactless communication and contactless charging are carried out at the same time, an electromagnetic interference (interference from the contactless charging coil to the magnetic induction antenna) that can occur at the time of contactless charging is reduced without spoiling visibility of the display part, and communication efficiency and communications distance in the contactless communication, and charging efficiency in the contactless charging can be secured.

In the above configuration, the magnetic induction antenna is arranged on the first magnetic body, a magnetic body opening which the first magnetic body is formed with has an area equal to or larger than that of the display opening which the housing is formed with, and the display opening is arranged within an area facing the magnetic body opening.

With the above configuration, visibility of the display part is secured.

In the above configuration, a first surface of the conductor that faces the magnetic induction antenna has an area larger than that of a surface surrounded by a loop of the magnetic induction antenna, and is arranged to face an antenna loop surface surrounded by the loop of the magnetic induction antenna within the area of the first surface, and a second surface of the conductor that faces the contactless charging coil has an area larger than that of a coil loop surface surrounded by a loop of the contactless charging coil, and is arranged to face the loop surface surrounded by the contactless charging coil within the area of the second surface.

With the above configuration, even if the thicknesses of the first magnetic body and the second magnetic body are not sufficiently secured because the device becomes thinner, the conductor blocks the leakage magnetic flux from the magnetic bodies. Particularly, the leakage magnetic flux from the second magnetic body to the magnetic induction antenna is blocked. Accordingly, the electromagnetic interference that can occur at the time of contactless charging is reduced without spoiling the visibility of the display part. Meanwhile, the charging efficiency in the contactless charging is further improved.

In the above configuration, the area of the first surface is larger than that of a surface which is surrounded by a periphery of the first magnetic body.

With the above configuration, the above effects are further enhanced.

In the above configuration, the area of the coil loop surface is smaller than that of the antenna loop surface.

With the above configuration, the electromagnetic interference that can occur at the time of contactless charging is further reduced.

In the above configuration, the conductor includes a first conductor and a second conductor. The first conductor includes a third surface which faces the display opening while providing the display part between the third surface and the display opening, and a fourth surface which is arranged opposite to the third surface. The second conductor includes a fifth surface which is arranged to provide a gap between the fifth surface and the first conductor and which faces the fourth surface, and a sixth surface which is arranged opposite to the fifth surface and on which the contactless charging coil is mounted, wherein areas of the fifth and sixth surfaces are smaller than areas of the third and fourth surfaces.

With the above configuration, the probability that the second magnetic body, the first circuit board or the housing is damaged, or the contactless charging coil falls off is reduced.

In the above configuration, the contactless charging coil is arranged between a battery which is a power supply of the communication device and a barcode scanner which reads out a barcode.

With the above configuration, the interference from the contactless charging coil to the neighborhood is reduced.

In the above configuration, the communication device includes a barcode scanner which reads out a barcode, and an external communication antenna which is arranged around a surface of the barcode scanner which does not face the contactless charging coil.

With the above configuration, the interference from the contactless charging coil to the external communication antenna is reduced.

In the above configuration, the external communication antenna forms such an angle with respect to an antenna loop surface of the magnetic induction antenna that an orthogonal component of the external communication antenna is larger than a parallel component of the external communication antenna.

With the above configuration, the interference that the external communication antenna receives from the NFC antenna can be reduced.

In the above configuration, the external communication antenna forms such an angle with respect to a coil loop surface of the contactless charging coil that an orthogonal component of the external communication antenna is larger than a parallel component of the external communication antenna.

With the above configuration, the interference that the external communication antenna receives from the contactless charging coil can be reduced.

In the above configuration, a frame-like ledge is provided at an opening of the housing, the first magnetic body and the magnetic induction antenna are arranged between the display part and the ledge, and a buffering member is arranged between the display part and the first magnetic body.

With the above configuration, while the impact resistance of the communication device is secured (damage of the first magnetic body is prevented), the assembling efficiency is improved.

In the above configuration, the communication device includes an optically transparent panel which is arranged at a side of the ledge opposite to the display part, and a sealing member arranged between the ledge and the optically transparent panel.

With the above configuration, while communication quality with the magnetic induction antenna and drop impact resistance of the communication device are secured, water, liquid, dust or the like is prevented from invading from the outside of the housing. That is, waterproof property and dust resistance of the communication device is further secured.

In the above configuration, the conductor further includes a circuit board and a battery. The circuit board includes: a first wiring pattern surface which faces the display opening while providing the display part between the first wiring pattern and the display opening; and a second wiring pattern surface which is arranged opposite to the first wiring pattern surface. The battery includes: a facing surface which faces the second wiring pattern surface and is arranged to provide a gap between the facing surface and the circuit board; and a charging coil setting surface, opposite to the facing surface, on which the contactless charging coil is mounted.

In the above configuration, the contactless charging coil and the second magnetic body are arranged away from a surface of the conductor that faces the contactless charging coil and the second magnetic body.

Advantageous Effects of Invention

In the present invention, a contactless charging coil and a magnetic induction antenna are laminated, and a first magnetic sheet is arranged between the contactless charging coil and the magnetic induction antenna. Thereby, a communication device having the following effects can be provided. The magnetic fields of the contactless charging coil and the magnetic induction antenna will not interfere with each other, and communication efficiency and communication distance can be prevented from decreasing.

EMBODIMENTS OF INVENTION

Hereinafter, communication devices according to embodiments of the present invention will be described by using the drawings.

Figure 1:
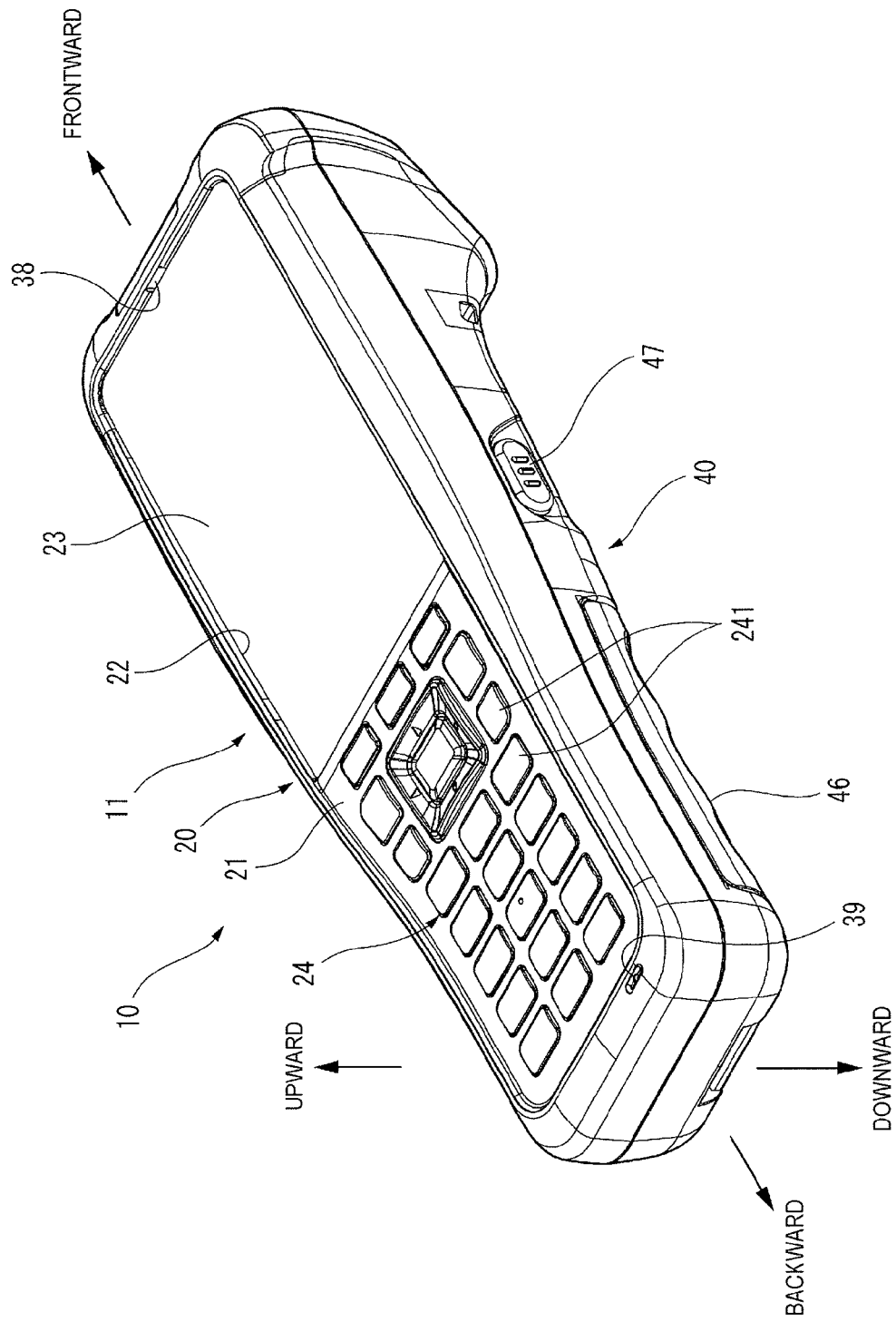
FIG. 1 is a perspective view of a communication device, which is seen from the front surface side, according to an embodiment of the present invention.

As shown in FIG. 1, a communication device 10 according to an embodiment of the present invention is, for example, a terminal device through which a delivery person who provides courier service can deal with delivery data on delivery addresses and payments with credit cards.

The communication device 10 has a housing 11 of a rectangular box-like shape as a whole. The housing 11 is divided at a middle position in the thickness direction, and has an upper housing 20 and a lower housing 40.

In the following discussion, the side of the upper housing 20 is assumed as an "upper" side, and the side of the lower housing 40 is assumed as a "lower" side. When a user holds to operate the communication device 10 by hand, the hand side is assumed as a "back" side, and the distal end side is assumed as a "front" side.

First, the planar arrangement of components in the housing 11 is described, and the arrangement in the thickness direction of the housing 11 will be described later.

Figure 2:
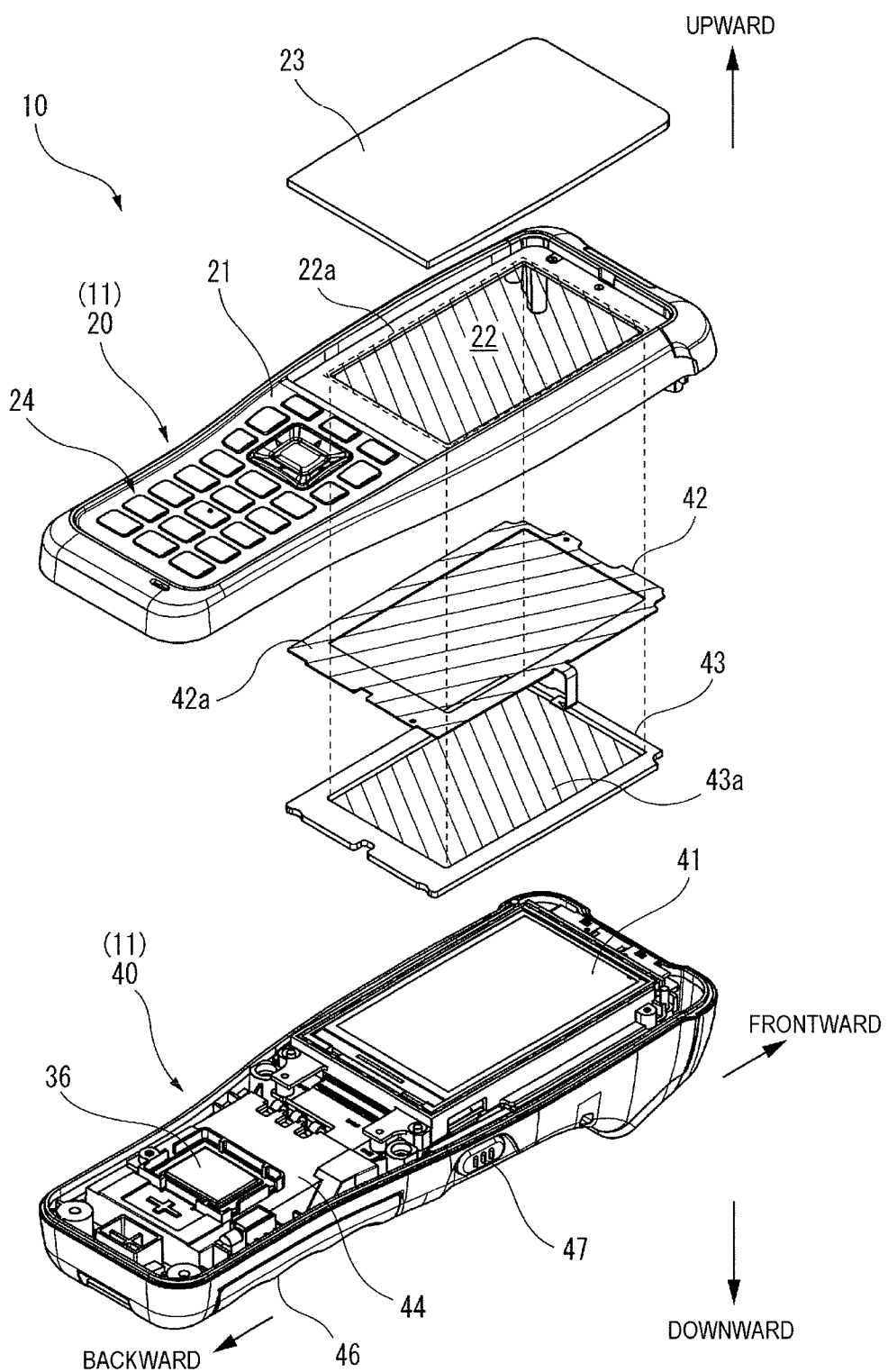
FIG. 2 is an exploded perspective view of the communication device, which is seen from the front surface side, according to the embodiment of the present invention.

As shown in FIGS. 1 and 2, in the communication device 10, a top surface 21 of the upper housing 20 is provided with an input part and a display part. An opening (display opening) 22 is provided at the front part of the top surface 21 of the upper housing 20. A touch panel (light transmitting protective panel) 23, which a user touches by hand for input, is attached to the opening 22 as the input part and the display part. The foremost part of the top surface 21 of the upper housing 20 is provided with a receiver 38. The back part of the top surface 21 of the upper housing 20 is provided with a key input part 24, in which keys 241 are pressed for input, as the input part.

The backmost part of the top surface 21 of the upper housing 20 is provided with a front microphone 39.

Figure 3:
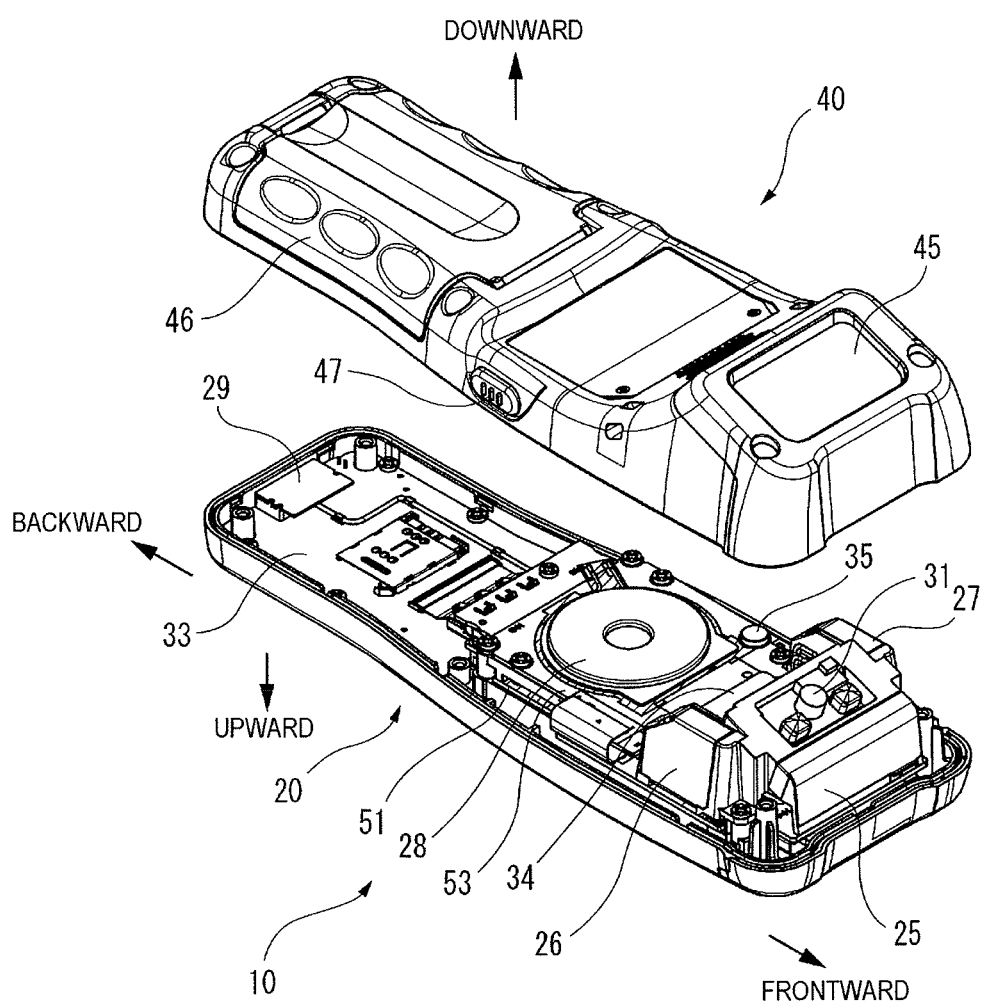
FIG. 3 is an exploded perspective view of the communication device, which is seen from the back surface side, according to the embodiment of the present invention.

As shown in FIG. 3, the front end of the upper housing 20 is provided with a 3G antenna 25 which is an external communication antenna. The side parts at the front end of the upper housing 20 are provided with a wireless LAN antenna 26 and a GPS antenna 27 which are external communication antenna. A barcode scanner 31, which is a two-dimensional barcode reader, is provided between the wireless LAN antenna 26 and the GPS antenna 27 at the front end of the upper housing 20.

The front part of the upper housing 20 is provided with a speaker 34 and a microphone 35.

The central part of the upper housing 20 is provided with a contactless charging coil 28, a primary board 51 and a secondary board 53 to be described below.

The back part of the upper housing 20 is provided with a keyboard board 33, which is below the key input part 24.

The back end of the upper housing 20 is provided with a high speed short distance contactless communication coupler 29.

As shown in FIG. 3, the front part of the lower housing 40 is provided with a scanner window 45, which is below the barcode scanner 31. The back end of the lower housing 40 is provided with a battery cover 46, which can be opened and closed, and a battery 44 (refer to FIG. 2) is stored inside the battery cover 46. The right and left side surfaces of the lower housing 40 are respectively provided with scan buttons 47 to operate the barcode scanner 31 to read barcodes.

As shown in FIG. 2, a liquid crystal module (display part) 41, which is a display panel, is attached to the inside of the lower housing 40 and is below the touch panel 23 at the front part. An NFC antenna (magnetic induction antenna) 42 to be described below which is a card reader for payment or user identification and a first magnetic sheet (first magnetic body) 43 are provided around the liquid crystal module 41. The NFC antenna 42 and the first magnetic sheet 43 have a frame shape, and have such an inner space that the display of the liquid crystal module 41 will not be hindered.

Therefore, what is displayed on the liquid crystal module 41 is visible from the outside through the opening 22 and the touch panel 23.

The battery 44 is stored at the back part of the lower housing 40. A SIM card 36 is attached to the inside (the upper side) of the battery 44. That is, while the upper housing 20 and the lower housing 40 are assembled, the liquid crystal module (display part) 41, the primary board 51, the secondary board 53, the receiver 38, the front microphone 39, the 3G antenna 25, the wireless LAN antenna 26, the GPS antenna 27, the barcode scanner 31, the NFC antenna (magnetic induction antenna) 42, the first magnetic sheet (the first magnetic body) 43, the battery 44 and the SIM card 36 are stored inside the housing 11.

Figure 4:
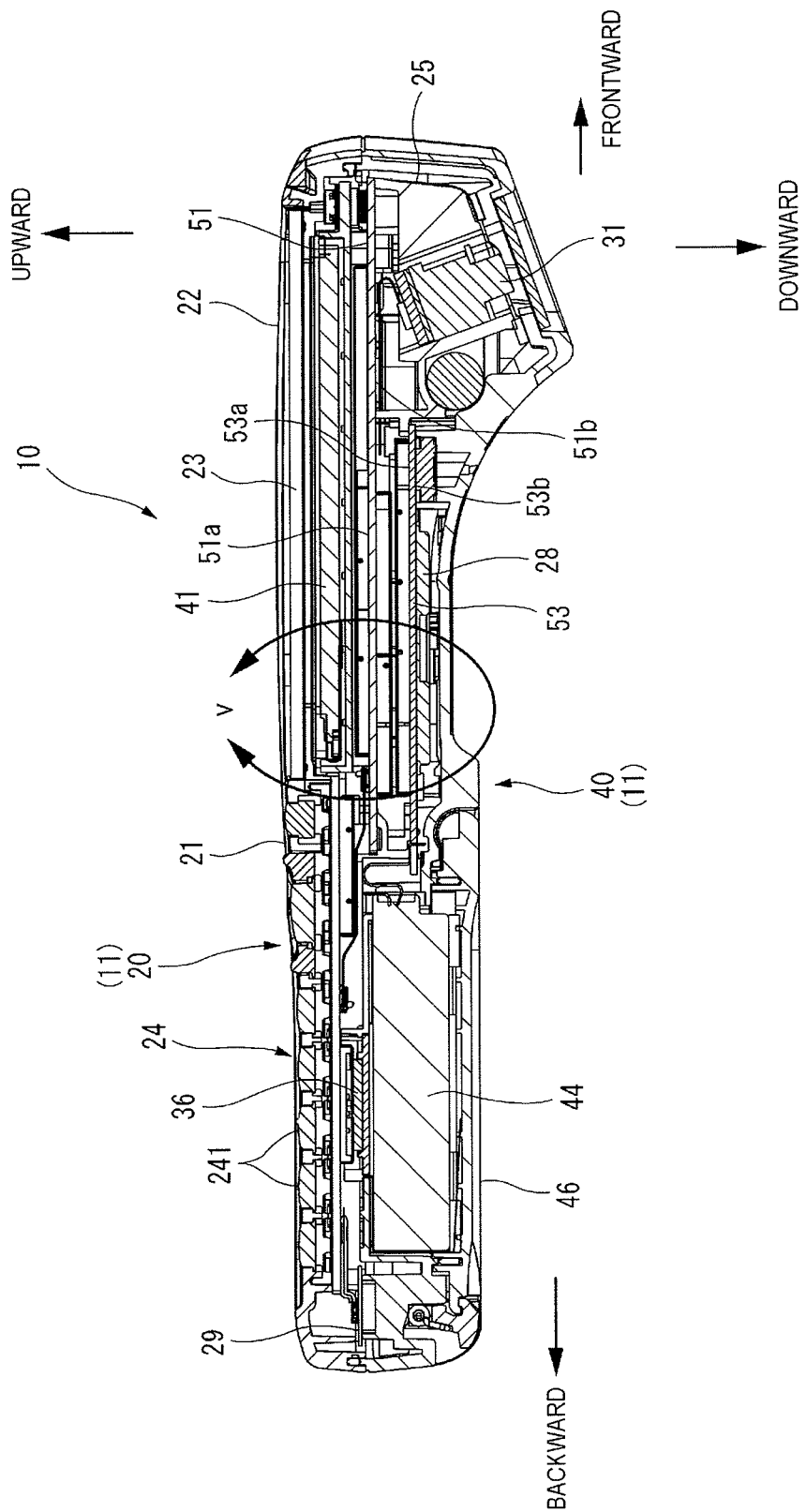
FIG. 4 is a sectional view of the communication device, which is cut along the longitudinal direction, according to the embodiment of the present invention.
Figure 5:
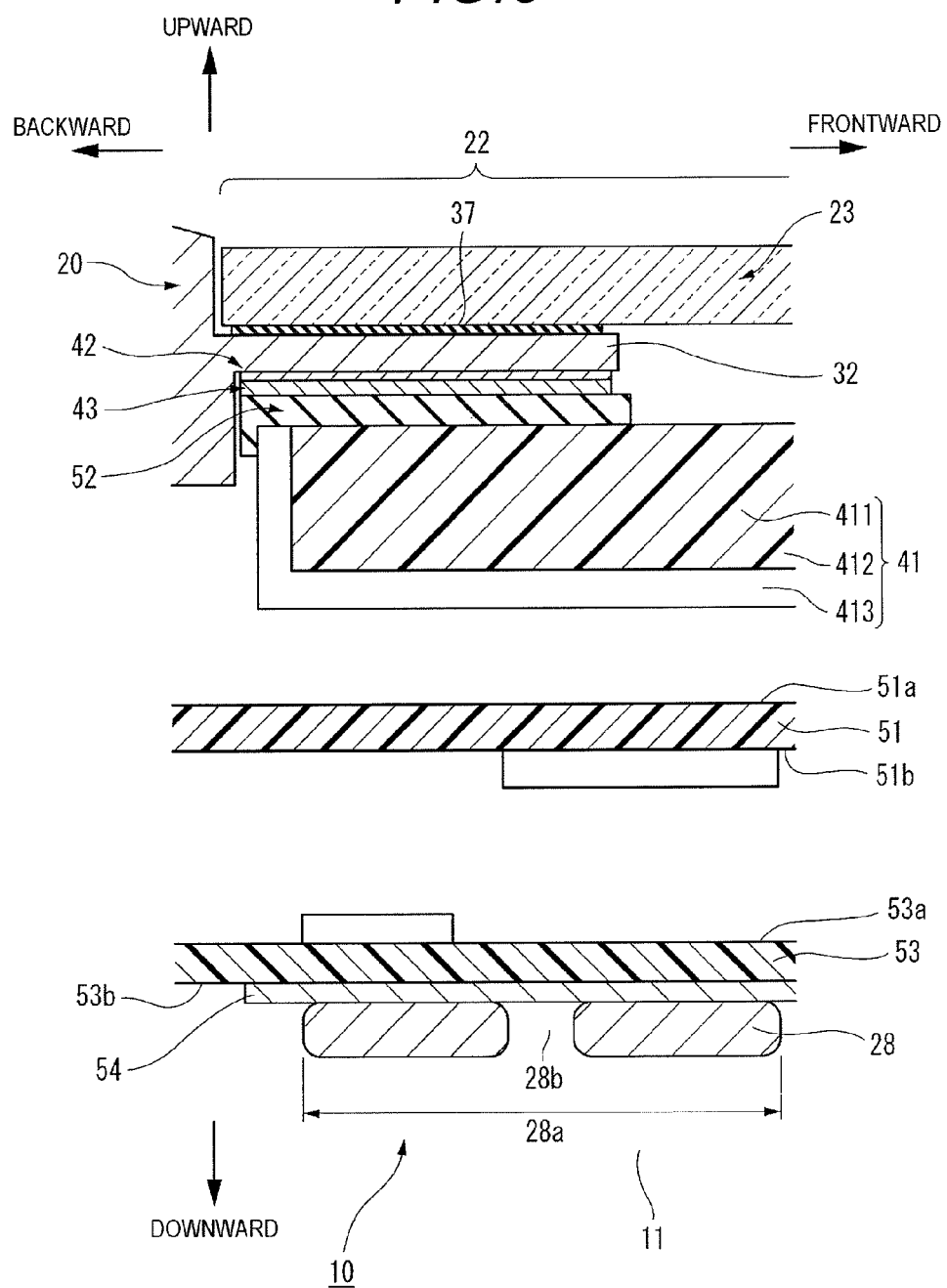
FIG. 5 is an enlarged view of a V part in FIG. 4.

Then, the arrangement of the parts in the thickness direction of the housing 11 is described. As shown in FIGS. 4 and 5, the primary board (board-like conductor) 51 is provided at the front part of the housing 11 and at the central part in the thickness direction of the housing 11. The liquid crystal module 41 is arranged above the primary board 51. In the liquid crystal module 41, a liquid crystal board 411 is attached to the top surface of a liquid crystal frame 413 through a liquid crystal rubber 412.

A frame-like ledge 32, which will not hinder the display of the liquid crystal board 411, is provided above the liquid crystal module 41 in the upper housing 20. That is, the ledge 32 is provided to cover a non-display area so that the displayable area set in the liquid crystal board 411 of the liquid crystal module 41 will not be hidden. The first magnetic sheet 43 and the NFC antenna 42, which are all frame-like, and a buffering cushion 52 are provided between the liquid crystal module 41 and the bottom surface of the ledge 32. The bottom surface of the ledge 32, the NFC antenna 42, the first magnetic sheet 43 and the cushion 52 are bonded by double-sided tapes not shown, respectively. The top surface of the ledge 32 and the touch panel 23 are bonded by a sealing member which has adhesiveness to prevent liquid such as water or mine dust from invading into the housing 11 of the communication device 10.

On the other hand, the secondary board 53 is provided below the primary board 51, and the contactless charging coil 28 is attached to the bottom side of the secondary board via a second magnetic sheet (second magnetic body) 54. That is, while the upper housing 20 and the lower housing 40 are assembled, the primary board (board-like conductor) 51, the secondary board 53, the contactless charging coil 28 and the second magnetic sheet (the second magnetic body) 54 are stored in the housing 11. The frequency that the second magnetic sheet 54 is related to (for example, around 100 kHz) is lower than the frequency that the first magnetic sheet 43 is related to (for example, around 13.56 MHz).

Next, operations of the communication device 10 according to the embodiment of the present invention are described.

The communication device 10 functions as a mobile phone by using the key input part 24, the 3G antenna 25, the receiver 38, the front microphone 39 and the like.

The current position of the communication device 10 can be easily specified by the GPS antenna 27. Various kinds of information such as codes recorded in a product to be sold or a shipping label can be easily acquired by reading barcodes with the barcode scanner 31. By bringing a contactless IC card close to the upper part of the touch panel 23, the NFC antenna 42 reads information on the contactless IC card in a contactless way.

Therefore, for example, a home delivery person can receive a payment by any card at a delivery address. The communication device 10 can be allowed to be used by a home delivery person by authenticating a contactless employee ID card which the home delivery person carries. On the contrary, the use of the communication device 10 can be refused if a person does not carry an employee ID card, or a person carries an employee ID card but is not allowed to use the communication device 10.

By bringing the contactless charging coil 28 at the bottom surface center of the lower housing 40 close to a radio power supply unit 90 (refer to FIG. 6), the battery 44 can be charged by receiving power supply in a contactless way.

Features of the communication device 10 according to the embodiment of the present invention which is constructed as described above are described as follows.

Figure 6:
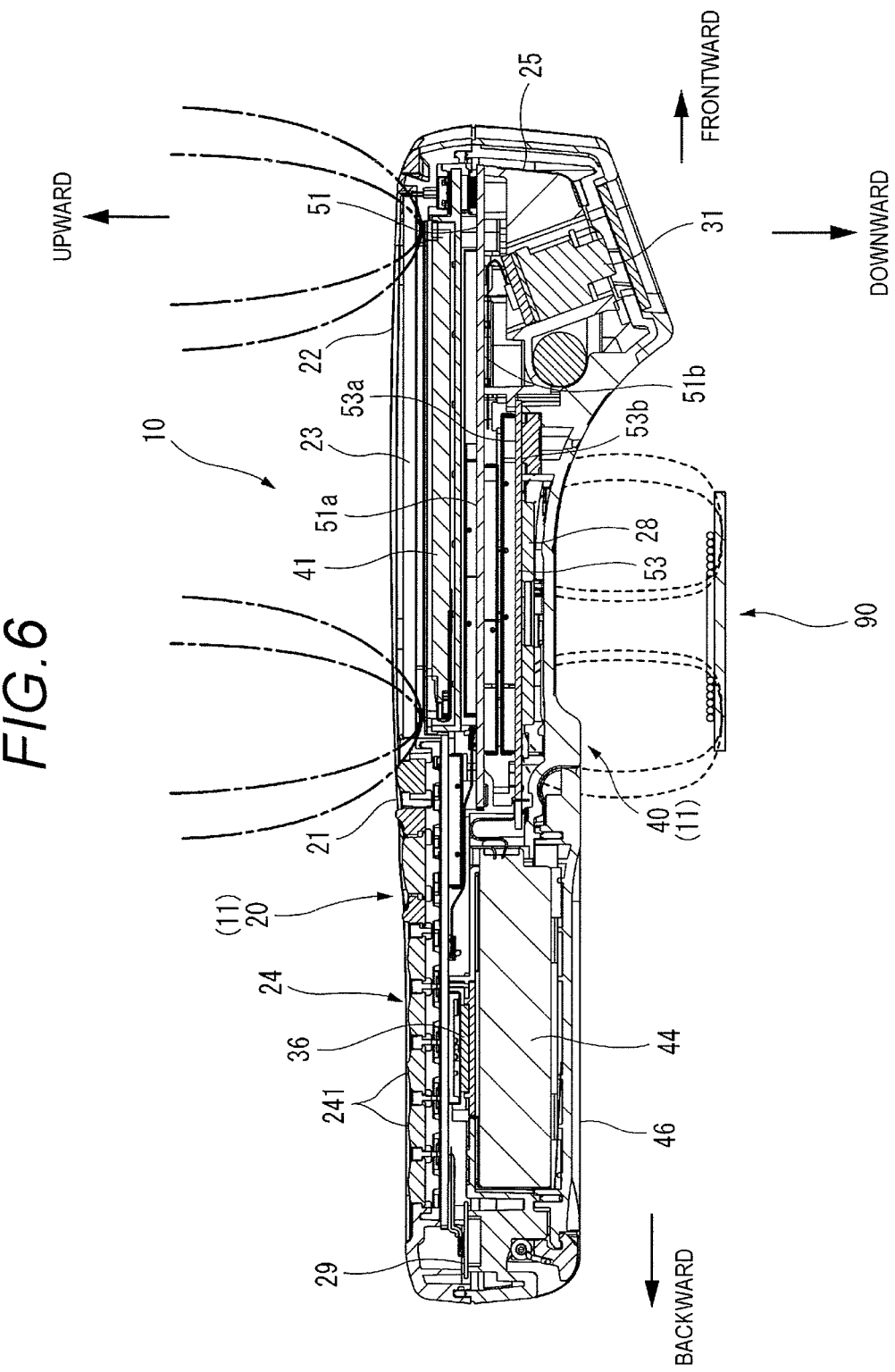
FIG. 6 is a side view which shows the function and effect of the communication device according to the embodiment of the present invention.

As shown in FIGS. 4 to 6, the liquid crystal module (display part) 41 which is display part and the primary board (the first conductor) 51 which is a board-like conductor are stored inside the housing 11 that is included in the communication device 10 according to the present embodiment. The opening 22 (display opening, refers to FIGS. 1 and 2) is so provided in the housing 11 that the displaceable area of the liquid crystal module 41 is visible from the outside. The NFC antenna 42, which is a magnetic induction antenna, is arranged to face one surface of the primary board 51 and to surround the opening 22. The contactless charging coil 28 is stored in the housing 11, and is arranged opposite to the NFC antenna 42 while providing the primary board 51 between the contactless charging coil 28 and the NFC antenna 42. The first magnetic sheet (the first magnetic body) 43 is arranged between the NFC antenna 42 and the primary board 51 and between the opening 22 and the primary board 51, and the second magnetic sheet (the second magnetic body) 54 is arranged between the contactless charging coil 28 and the primary board 51.

Thereby, particularly when contactless communication and contactless charging are carried out at the same time, an electromagnetic interference (interference from the contactless charging coil 28 to the NFC antenna 42) that can occur at the time of contactless charging is reduced without spoiling visibility of the display part, and communication efficiency and communications distance in the contactless communication, and charging efficiency in the contactless charging can be secured. That is, as shown in FIGS. 5 and 6, magnetic fields occurring due to the NFC antenna 42 and the contactless charging coil 28 are brought to the sides opposite to the primary board 51 by the first magnetic sheet (the first magnetic body) 43 and the second magnetic sheet (the second magnetic body) 54, respectively. Therefore, interference from the contactless charging coil 28, which is required to transmit particularly large power, to the NFC antenna 42 can be reduced. Meanwhile, since the magnetic field that the NFC antenna 42 produces is brought into the side opposite to the primary board 51, communication distance of the contactless communication with the NFC antenna 42 spreads, and the communication efficiency is improved.

As shown in FIG. 2, the NFC antenna 42 is arranged on the first magnetic sheet 43. A magnetic sheet opening (magnetic body opening) 43a, which is formed in the first magnetic sheet 43, has an area the same as or larger than that of the opening 22, which is formed in the housing 11, and the opening 22 is arranged within a surface 22a which is virtually formed to face the magnetic sheet opening 43a. Therefore, the NFC antenna 42 and the first magnetic sheet 43 will not spoil the visibility of the displayable area of the liquid crystal module 41.

As the communication device 10 according to the present embodiment becomes thinner, it is possible that the thicknesses of the first magnetic sheet 43 and the second magnetic sheet 54 may not be sufficiently secured. Then, the magnetic fields occurring from the coils of the NFC antenna 42 and the contactless charging coil 28 will not be brought sufficiently beyond the magnet sheets in the directions of away from the primary board 51, and leakage magnetic flux occurs to the primary board 51. Therefore, particularly when contactless communication and contactless charging are carried out at the same time, an electromagnetic interference (interference from the contactless charging coil 28 to the NFC antenna 42) that can occur at the time of contactless charging occurs, and communication efficiency and communication distance in the contactless communication, and charging efficiency in the contactless charging cannot be secured.

Thus, in the communication device 10 according to the present embodiment, a first wiring pattern surface (a first surface) 51a (refer to FIGS. 4 and 5), which faces the NFC antenna 42, of the primary board 51, which is a board-like conductor, has an area larger than that of a surface (antenna loop surface) 42a (refer to FIG. 2) which is surrounded by the loop of the NFC antenna 42. More desirably, the first wiring pattern surface has an area larger than that of a surface which is surrounded by the periphery of the first magnetic sheet 43 on which the NFC antenna 42 is mounted. The first wiring pattern surface 51a is arranged to face the surface 42a which is surrounded by the loop of the NFC antenna 42 within the area of the first wiring pattern surface 51a. A second wiring pattern surface (a second surface) 51b (refer to FIGS. 4 and 5), which faces the contactless charging coil 28, of the primary board 51, which is a board-like conductor, has an area larger than that of a surface (coil loop surface) 28a (refer to FIGS. 3 and 5), which is surrounded by the loop of the contactless charging coil 28. The second wiring pattern surface 51b is arranged to face the loop surface 28a of the contactless charging coil 28 within the area of the second wiring pattern surface 51b. The surface 28a surrounded by the loop of the contactless charging coil 28 in the communication device 10 according to the present embodiment has an area smaller than that of the surface 42a surrounded by the loop of the NFC antenna 42.

Thereby, even if the thicknesses of the first magnetic sheet 43 and the second magnetic sheet 54 (particularly the second magnetic sheet 54) are not sufficiently secured when the device becomes thinner, the primary board 51, which is a board-like conductor, blocks the leakage magnetic flux from these magnetic bodies. Particularly, the leakage magnetic flux from the second magnetic sheet 54 to the NFC antenna 42 is blocked. Therefore, the electromagnetic interference that can occur at the time of contactless charging is reduced without spoiling the visibility of the display part. Meanwhile, the charging efficiency in the contactless charging is further improved. Those effects are further enhanced when the second magnetic sheet 54 has an area that is wider than that of the surface 28a which is surrounded by the loop of the contactless charging coil 28. Those effects are enhanced when the second magnetic sheet 54 is formed continuously at the inner side of the surface 28a which is surrounded by the loop of the contactless charging coil 28 to fill a hollow part 28b which is at the inner side of the surface 28a. Furthermore, the electromagnetic interference that can occur at the time of contactless charging is further reduced when the surface 28a surrounded by the loop of the contactless charging coil 28 has an area smaller than that of the surface 42a surrounded by the loop of the NFC antenna 42.

In the communication device 10 according to the present embodiment, the primary board (the first circuit board) 51 serves as a main electromagnetic shield. Additionally, the secondary board (the second circuit board) 53 to which the contactless charging coil 28 is arranged and the frame 413 which supports the liquid crystal board 411 of the liquid crystal module 41 are board-like conductors that serve as electromagnetic shields in the communication device 10 according to the present embodiment. The secondary board 53 is so arranged that a gap is provided between the primary board 51 and the secondary board 53. The areas of the wiring pattern surfaces 53a (third wiring pattern surface) and 53b (fourth wiring pattern surface) of the secondary board 53 that face the contactless charging coil 28 are larger than that of the surface 28a which is surrounded by the loop of the contactless charging coil 28 (refer to FIGS. 3 and 5). The areas of the wiring pattern surfaces 53a and 53b of the secondary board 53 to which the contactless charging coil 28 is arranged are smaller than that of the wiring pattern surfaces 51a (first wiring pattern surface) and 51b (second wiring pattern surface) of the primary board 51. The reason is described in more detail as follows.

The NFC antenna 42 is arranged to face the first wiring pattern surface 51a of the primary board 51, and surround the opening 22 which is so provided that the displayable area of the liquid crystal module 41 are visible from the outside. The first surface (first wiring pattern surface) 51a (refer to FIGS. 4 and 5) of the primary board 51 which faces the NFC antenna 42 has an area larger than that of the surface 42a (refer to FIG. 2) which is surrounded by the loop of the NFC antenna 42. More desirably, the first surface 51a has an area larger than that of the surface which is surrounded by the periphery of the first magnetic sheet 43 on which the NFC antenna 42 is loaded. To make it easy to carry out business operations, it is required that the liquid crystal module 41 of the communication device 10 includes a screen as large as possible. That is, this means that the areas of the wiring pattern surfaces 51a and 51b of the primary board 51 which is a board-like conductor also increase as the size of the screen of the liquid crystal module 41 increases.

As described above, the communication device 10 according to the present embodiment is used for business, for example, in an outdoor place or a warehouse. Therefore, the communication device 10 may drop by accident, for example, because the communication device 10 is used with a slippery hand.

Here, it may be considered that the contactless charging coil 28 and the second magnetic sheet 54 which supports the contactless charging coil 28 are mounted on a board-like conductor of a large area such as the primary board 51. The contactless charging coil 28 has a setting plane much larger than that of the other components mounted on the primary board 51. The second magnetic sheet 54, which is arranged between the contactless charging coil 28 and the board and which supports the contactless charging coil 28, has a setting plane further larger than that of the contactless charging coil 28. (An IC or LSI may be incorrectly recognized to have a large setting plane at first glance, but actually there is a plurality of point contacts.)

When the communication device 10 drops while the large board-like conductor of the area such as the primary board 51 is stored inside the housing 11, the primary board 51 greatly vibrates at a point spaced from a fixed part to the housing 11 with screws or the like. While the primary board 51 vibrates due to the drop, the contactless charging coil 28 mounted on the primary board 51 and the second magnetic sheet 54 which supports the contactless charging coil 28 also oscillate. The primary board 51 is formed of metal such as copper that makes the wiring pattern of electronic circuits, and glass epoxy or the like which supports the wiring pattern. The contactless charging coil 28 is also mainly formed of metal such as copper. However, the second magnetic sheet 54 is more likely to break than the primary board 51 and the contactless charging coil 28 when stress is increased. Further, the part of the primary board 51 on which the contactless charging coil 28 and the second magnetic sheet 54 which supports the contactless charging coil 28 is mounted has a wide area where the contactless charging coil 28 and the second magnetic sheet 54 are fixed onto the primary board 51 by adhesive. Therefore, it is hard for these mounted parts to vibrate in response to stress applied due to the impact while the communication device 10 drops. As a result, the primary board 51 may be damaged, or the contactless charging coil 28 may fall off from the primary board 51. In contrast, when fixed points of the primary board 51 to the housing 11 are increased, stress concentrates on particular fixed points of the housing 11, and the housing 11 may be damaged.

Therefore, it is desirable that the contactless charging coil 28 and the second magnetic sheet 54 which supports the contactless charging coil 28 are mounted on the secondary board 53 which is a board-like conductor other than the primary board 51, and the area of the secondary board 53 is smaller than that of the primary board 51. Because the distance of the secondary board 53 from the fixed part to the housing 11 with screws or the like to the maximum spaced point can be smaller than that of the primary board 51, the vibration at the time of dropping at the maximum spaced point can be decreased. Thereby, the possibility that the second magnetic sheet 54, the primary board 51 or the housing 11 is damaged, or the contactless charging coil 28 falls off is reduced.

The contactless charging coil 28 may be supported by a supporting body other than the conductor such as the secondary board 53 in FIGS. 3 and 4. For example, the support body may be a nonconductor such as a plastic board or a ceramic board. Alternatively, the contactless charging coil 28 may be attached to the primary board 51 or the lower housing 40 through a buffering member by double-sided tape or adhesive. That is, the contactless charging coil 28 and the second magnetic sheet 54 which supports the contactless charging coil 28 may be spaced from the conductor such as the primary board 51 (from the surface of the primary board 51 that faces the contactless charging coil 28 and the second magnetic sheet 54 which supports the contactless charging coil 28) in the board thickness direction. In such a form, the previously described drop impact resistance is secured.

Even if circuit boards such as the primary board 51 and the secondary board 53 are not arranged between the NFC antenna 42 and the contactless charging coil 28, at least the frame 413 of the liquid crystal module 41 is arranged between the NFC antenna 42 and the contactless charging coil 28. This is because the NFC antenna 42 is arranged to surround the opening 22 which is so provided that the displayable area of the liquid crystal module 41 are visible from the outside. In this case, it is desirable that the antenna wiring pattern (not shown in the figure) which the NFC antenna 42 includes is arranged within a virtually formed surface which faces the frame 413 of the liquid crystal module 41. Thereby, the influence of the interference from the contactless charging coil 28 on the NFC antenna 42 can be further reduced.

Here, the explanation on the features of the communication device 10 according to the present embodiment continues. The NFC antenna 42 is arranged inside the housing 11, namely, at the lower side (the liquid crystal module side) of the ledge 32 in FIG. 5. This is to balance assembling efficiency with waterproof property and dust resistance which are required when the communication device 10 according to the present embodiment is assumed to be used outdoors as described below. However, if it is not necessary to consider the waterproofing, dust resistance and assembling efficiency, the NFC antenna 42 may be arranged above the ledge 32 in FIG. 5. In this case, a user can easily specify a position where a chip card is held.

Conversely, it is desirable that the contactless charging coil 28 is in the housing 11 to protect a user from being electrically shocked. The power transmitted by the contactless charging coil 28 is much higher than that transmitted by the NFC antenna 42. If the contactless charging coil 28 is outside the housing 11, a user who touches the contactless charging coil 28 may be electrically shocked.

As shown in FIG. 4, the contactless charging coil 28 in the communication device 10 according to the present embodiment is arranged between the battery 44 and the barcode scanner 31. The battery 44 and the barcode scanner 31 include housings of metal conductors or die-cast conductors. The interference from the contactless charging coil 28 to the neighborhood is reduced by arranging the contactless charging coil 28 in the space secured between these conductors.

It is considered to change the arrangement shown in FIG. 4 and to rearrange the battery 44 and the contactless charging coil 28. However, in the arrangement, the heavy battery 44 and the barcode scanner 31 are further biased to the barcode scanner 31 side than the central part of the housing 11 of the communication device 10. In addition, because the contactless charging coil 28 becomes close to the high speed short distance contactless communication coupler 29, interference to the high speed short distance contactless communication coupler 29 may happen. Instead, because the weight for the arrangement of the communication device 10 according to the present embodiment shown in FIG. 4 is well balanced, it is easy for a user to hold the communication device 10, and it is hard for the communication device 10 to drop. The good weight balance also favors the drop impact resistance. Furthermore, because the battery 44 which is a conductor is arranged between the high speed short distance contactless communication coupler 29 and the contactless charging coil 28, interference to the high speed short distance contactless communication coupler 29 can be prevented.

As shown in FIGS. 3, 4 and 6, a plurality of external communication antenna including the 3G antenna 25, the wireless LAN antenna 26 and the GPS antenna 27 of the communication device 10 according to the present embodiment are arranged around the housing of the barcode scanner 31. These external communication antennas form an angle perpendicular to the surface 42a (refer to FIG. 2) surrounded by the loop of the NFC antenna 42 or an angle close to the perpendicular angle (namely, such an angle that the orthogonal component is larger than the parallel component). These external communication antennas form an angle perpendicular to the surface (coil loop surface) 28a (refer to FIGS. 3 and 5) surrounded by the loop of the contactless charging coil 28 or an angle close to the perpendicular angle (namely, such an angle that the orthogonal component is larger than the parallel component). With such a configuration, the interference that these external communication antennas receive from the NFC antenna 42 and the contactless charging coil 28 can be reduced.

In addition to these, the communication device 10 according to the present embodiment also has waterproof property (liquid resistance or drop resistance), dust resistance, assembling easiness, and impact resistance which are necessary to be further used for business in an outdoor place or a warehouse. That is, first, as shown in FIGS. 4 and 5, the frames-like ledge 32, which will not hinder the display of the liquid crystal board 411, is provided above the liquid crystal module 41. The ledge 32 is provided at the opening (display opening) 22 of the housing 11, and covers a part of the liquid crystal module 41, namely, the non-display area. Thereby, contents displayed on the liquid crystal module 41 become visible from the outside. The NFC antenna 42 is arranged at the liquid crystal module 41 side of the ledge 32. The first magnetic sheet 43 and the NFC antenna 42, which are all frame-like, and a buffering cushion 52 are provided between the liquid crystal module 41 and the bottom surface of the ledge 32. The bottom surface of the ledge 32, the NFC antenna 42, the first magnetic sheet 43 and the cushion 52 are bonded by double-sided tapes not shown, respectively.

With the above arrangement, while the impact resistance of the communication device 10 is secured (damage of the first magnetic body is prevented), the assembling efficiency is improved. That is, the NFC antenna 42, the first magnetic sheet 43 and the cushion 52 are attached to the upper housing 20 of the housing 11 beforehand. Then, the secondary board 53, the barcode scanner 31 and the high speed short distance contactless communication coupler 29 are attached to the upper housing 20. Besides, the liquid crystal module 41 is mounted on the primary board 51 beforehand. The primary board 51 is attached to the upper housing 20 after the NFC antenna 42 and the like, the secondary board 53, the barcode scanner 31 and the high speed short distance contactless communication coupler 29 are attached. In this assembling method, the NFC antenna 42, the first magnetic sheet 43 and the cushion 52 are easy to be positioned below the ledge 32. When the communication device 10 drops, the natural vibration frequency of the housing 11 (upper housing 20) is different from that of the primary board 51. In this case, the distance between the NFC antenna 42, the first magnetic sheet 43 and the cushion 52 attached to the upper housing 20 of the housing 11 and the liquid crystal module 41 attached to the primary board 51 changes temporally due to the impact when the communication device 10 drops. That is, the NFC antenna 42, the first magnetic sheet 43 and the cushion 52 repeatedly come near to (or come into contact with) and leave from the liquid crystal module 41 for a while after the drop. Without the cushion 52, it is possible that the first magnetic sheet 43 contacts the end of the frame 413 of the liquid crystal module 41 so that the first magnetic sheet 43 is broken, or the NFC antenna 42 receives damages such as a wound or a tear. Therefore, if the cushion (buffering member) 52 is arranged between the NFC antenna 42 and the liquid crystal module 41 like the communication device 10 according to the present embodiment, damages of the first magnetic sheet 43 and the NFC antenna 42 described as above can be prevented.

As shown in FIG. 5, the communication device 10 according to the present embodiment further includes the touch panel (optically transparent panel) 23 which is optically transparent so that the displayable area of the liquid crystal module 41 is visible from the outside. The touch panel 23 is held above the surface of the ledge 32 opposite to the liquid crystal module 41 through a sealing member 37. Thereby, while communication quality with the NFC antenna 42 and the drop impact resistance of the communication device 10 are secured, water, liquid, dust or the like is prevented by the sealing member 37 from invading from the outside of the housing 11. That is, waterproof property and dust resistance of the communication device is further secured.

Figure 7:
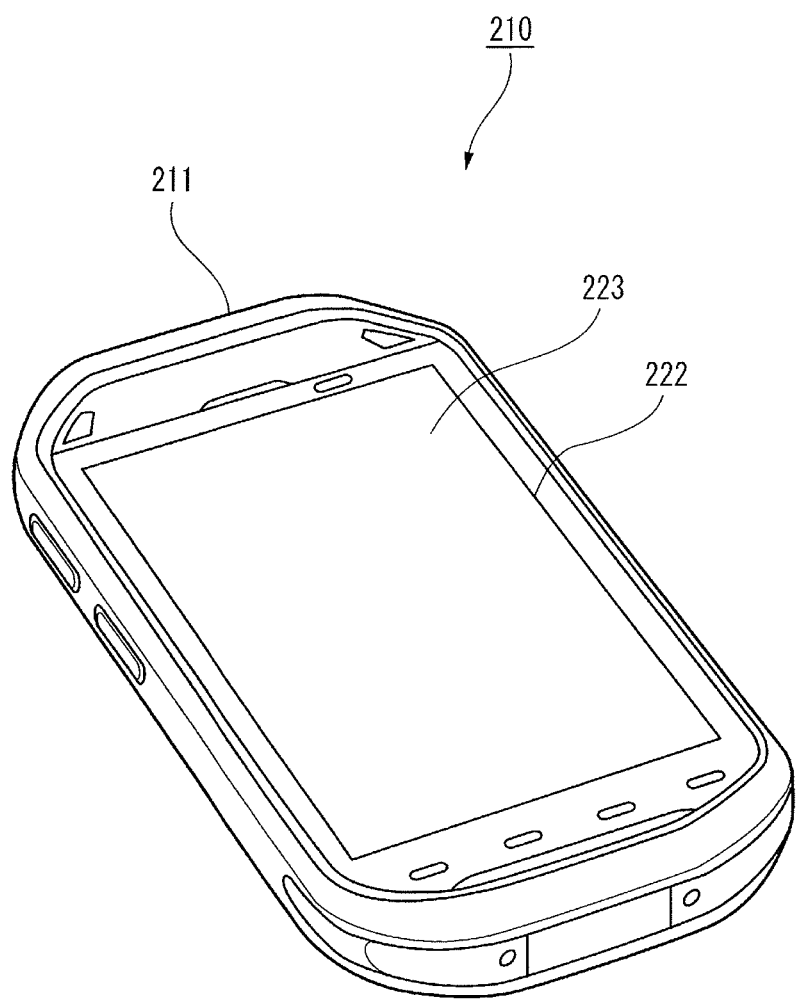
FIG. 7 is a perspective view of a variation of the communication device, which is seen from the front surface side, according to the embodiment of the present invention.
Figure 8:
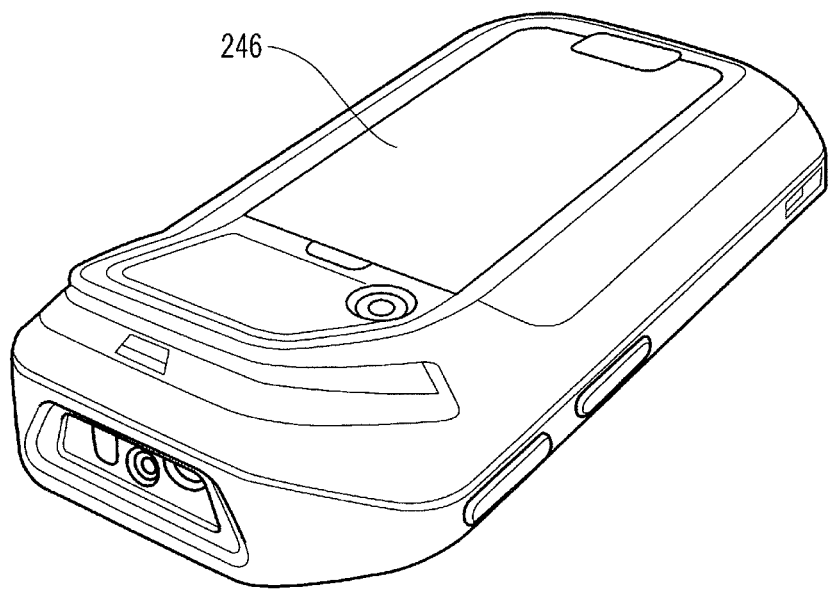
FIG. 8 is a perspective view of the variation of the communication device, which is seen from the back surface side, according to the embodiment of the present invention.
Figure 9:
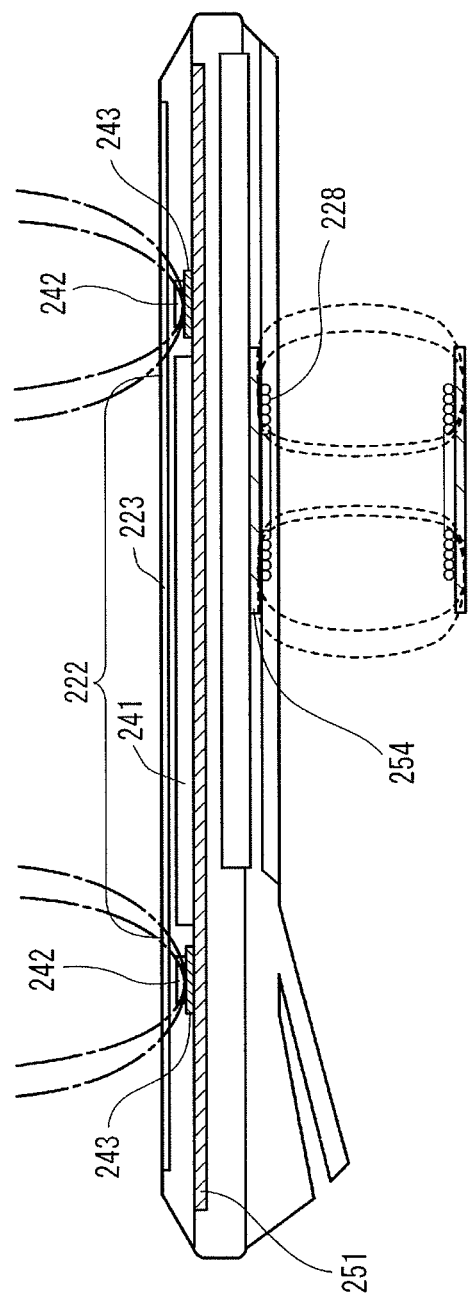
FIG. 9 is a transparent view of the variation of the communication device, which is seen from the side surface, according to the embodiment of the present invention.
Figure 10:
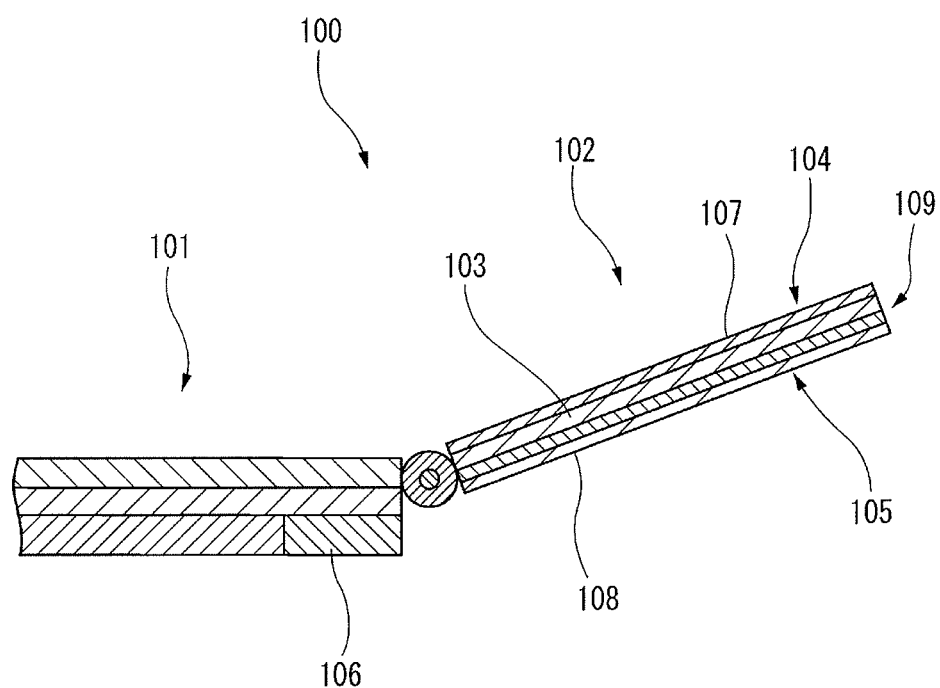
FIG. 10 is a sectional view of a traditional communication device.

Although the present invention is described based on the feathers of the communication device 10 according to the embodiment of the present invention as above, the communication devices of the present invention are not limited to the above mentioned embodiment, but instead appropriate variations, modifications, etc. are possible. For example, in FIGS. 7 to 9, a communication device 210 is a small device such as a smartphone. The communication device 210 has a displayable area of a liquid crystal module 241 which is stored in the area of a large-scale touch panel 223, namely, a substantial display opening 222. The communication device 210 includes an NFC antenna 242 and a first magnetic sheet 243 which supports the NFC antenna 242 on a circuit board 251 to surround the substantial display opening 222. In this case, in the communication device 210, a contactless charging coil 228 may be arranged at the housing 211 inner side of a battery cover 246, or above a surface which face the battery cover 246 of a battery 244. In this case, because the battery 244 is a conductor, a second magnetic sheet 254 is arranged between the battery 244 and the contactless charging coil 228. With such a configuration, particularly when contactless communication and contactless charging are carried out at the same time, without spoiling the visibility of the display part, electromagnetic interference (interference from the contactless charging coil 228 to the NFC antenna 242) that may occur at the time of contactless charging is reduced, and communication efficiency and communication distance in the contactless communication, and the charging efficiency in the contactless charging can be secured. A secondary board not shown in the figures may be between the second magnetic sheet 254 and the battery 244, and the contactless charging coil 228 and the second magnetic sheet 254 may be mounted on the secondary board. In this way, the contactless charging coil 228 and the second magnetic sheet 254 are modularized by the secondary board, and assembling efficiency and component exchangeability is improved. In particular, when the contactless charging coil 228 and the second magnetic sheet are arranged on the battery 244, the battery 244 is also modularized. At this time, because the contactless charging coil 228 and the second magnetic sheet 254 are modularized by being mounted on the secondary board, even when a trouble occurs to the battery 244, it is possible to only change the battery 244 at the manufacturer side. The contactless charging coil 228 and the second magnetic sheet 254, which are modularized by being mounted on the secondary board, is reused.

INDUSTRIAL APPLICABILITY

The present invention has such an effect that communication efficiency and communication distance can be prevented from decreasing, and can be applied to communication devices having a contactless communication IC module and a contactless charging module.

REFERENCE SIGNS LIST

10: communication device
11: housing
25: 3G antenna (external communication antenna)
28: contactless charging coil
31: barcode scanner (two-dimensional barcode reader)
32: ledge
41: liquid crystal module (display device)
42: NFC antenna (magnetic induction antenna)
43: first magnetic sheet (first magnetic body)
44: battery
51: primary board (board-like conductor)
54: second magnetic sheet (second magnetic body)

The invention claimed is:

1. A communication device, comprising:
a display;
a housing that has a display opening so that the display is visible from outside, and accommodates the display;
a magnetic induction antenna that is accommodated in the housing and surrounds the display opening;
a contactless charging coil that is accommodated in the housing;
a circuit board that is positioned between the magnetic induction antenna and the contactless charging coil;
a first magnetic body that is positioned between the magnetic induction antenna and the circuit board; and
a second magnetic body that is positioned between the contactless charging coil and the circuit board.

2. The communication device according to claim 1, wherein
the magnetic induction antenna is provided on the first magnetic body,
the first magnetic body has a magnetic body opening, which is equal to or larger than the display opening, and
the display opening is positioned within an area facing the magnetic body opening.

3. The communication device according to claim 1, wherein
a first surface of the circuit board faces an antenna loop surface of the magnetic induction antenna, and is larger than the antenna loop surface of the magnetic induction antenna, the antenna loop surface being surrounded by a loop of the magnetic induction antenna, and
a second surface of the circuit board faces a coil loop surface of the contactless charging coil, and is larger than the coil loop surface of the contactless charging coil, the coil loop surface being surrounded by a loop of the contactless charging coil.

4. The communication device according to claim 3, wherein
the first surface is larger than a surface surrounded by an outline of the first magnetic body.

5. The communication device according to claim 3, wherein
the coil loop surface is smaller than the antenna loop surface.

6. The communication device according to claim 1, wherein
the circuit board includes a first circuit board and a second circuit board,
the first circuit board includes a third surface, which faces the display opening, with the display positioned between the third surface and the display opening, and a fourth surface, which is positioned opposite to the third surface, and
the second circuit board includes a fifth surface, which is spaced from the first circuit board and faces the fourth surface, and a sixth surface, which is positioned opposite to the fifth surface and on which the contactless charging coil is mounted, and
the fifth and sixth surfaces are smaller than the third and fourth surfaces.

7. The communication device according to claim 1, wherein
the contactless charging coil is positioned between a battery, which is a power supply of the communication device, and a barcode scanner, which reads a barcode.

8. The communication device according to claim 1, further comprising:
a barcode scanner that reads a barcode; and
an external communication antenna that is positioned around a surface of the barcode scanner which does not face the contactless charging coil.

9. The communication device according to claim 8, wherein
the external communication antenna forms an angle with respect to an antenna loop surface of the magnetic induction antenna such that an orthogonal component of the external communication antenna is larger than a parallel component of the external communication antenna.

10. The communication device according to claim 8, wherein
the external communication antenna forms an angle with respect to a coil loop surface of the contactless charging coil such that an orthogonal component of the external communication antenna is larger than a parallel component of the external communication antenna.

11. The communication device according to claim 1, wherein
a frame-like ledge is provided at the display opening of the housing,
the first magnetic body and the magnetic induction antenna are provided between the display and the ledge, and
a buffering member is provided between the display and the first magnetic body.

12. The communication device according to claim 11, further comprising:
an optically transparent panel provided on an opposite side of the ledge from a side where the display is provided; and
a sealing member provided between the ledge and the optically transparent panel.

13. The communication device according to claim 1, wherein further comprising
a battery that supplies power to the circuit board,
wherein the circuit board further comprises:
a first wiring pattern surface which faces the display opening, the display part being positioned between the first wiring pattern surface and the display opening; and
a second wiring pattern surface which is positioned opposite to the first wiring pattern surface, and
wherein the battery includes:
a facing surface which faces the second wiring pattern surface and is spaced from the circuit board; and
a charging coil setting surface, opposite to the facing surface, on which the contactless charging coil is mounted.

14. The communication device according to claim 1, wherein
the contactless charging coil and the second magnetic body are spaced from a surface of the circuit board that faces the contactless charging coil and the second magnetic body.

15. The communication device according to claim 1, wherein
the magnetic induction antenna and the first magnetic body are provided between the housing and the display.

16. The communication device according to claim 15, further comprising a panel that is supported by the housing,
wherein the magnetic induction antenna and the first magnetic body are provided between the panel and the display.

17. A communication device, comprising:
a housing;
a circuit board that is accommodated in the housing;
a display that is accommodated in the housing and is positioned on a first side of the circuit board;
a first winding that performs a wireless communication and is positioned on the first side of the circuit board;
a second winding that receives a wireless power and is positioned on a second side of the circuit board;
a first magnetic body that is positioned between the first winding and the circuit board; and
a second magnetic body that is positioned between the second winding and the circuit board.

* * * * *